July 31, 1951  M. M. RICKMAN  2,562,578
LAWN MOWER SHARPENING MACHINE
Filed June 15, 1948  4 Sheets-Sheet 1
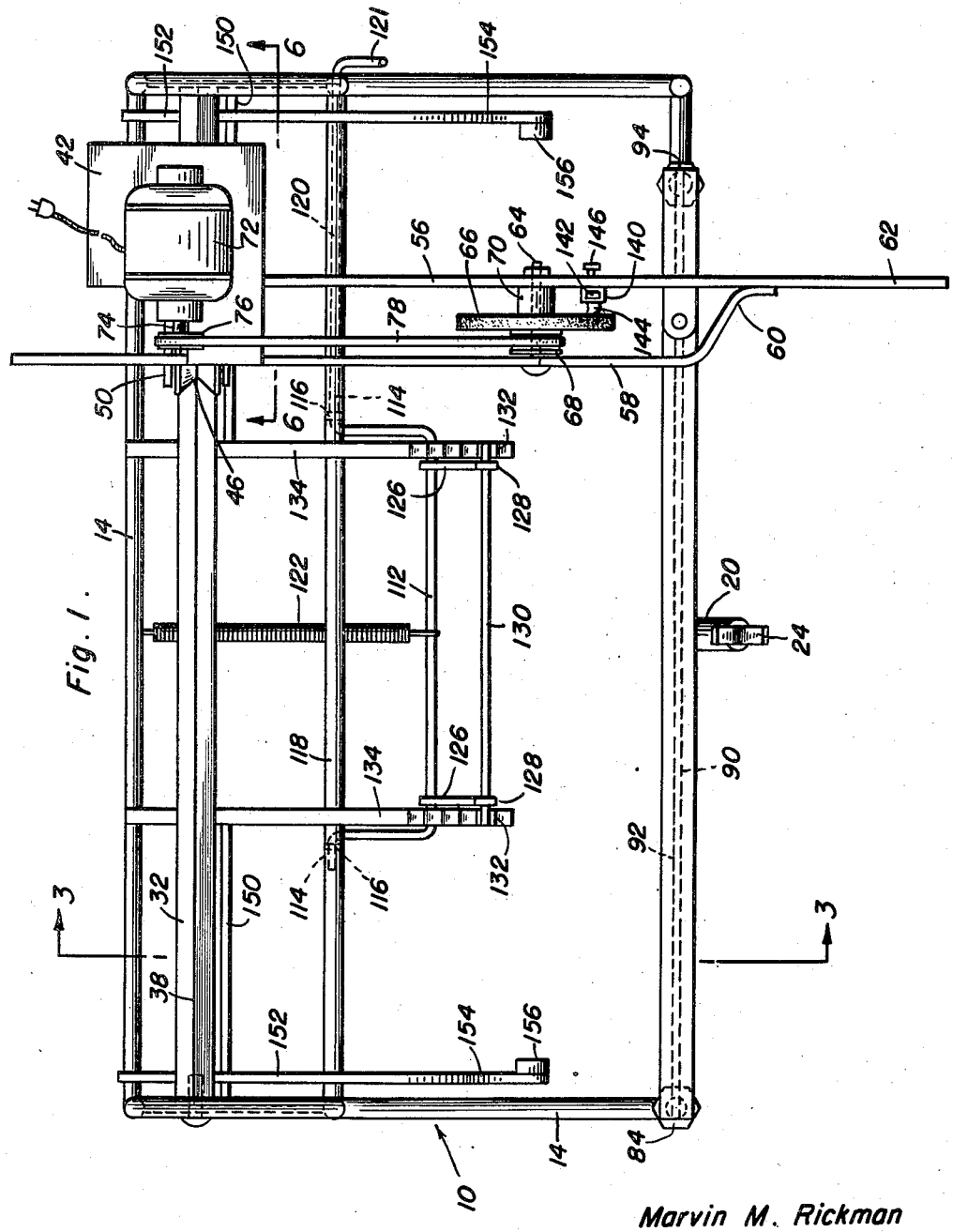
Marvin M. Rickman
INVENTOR.

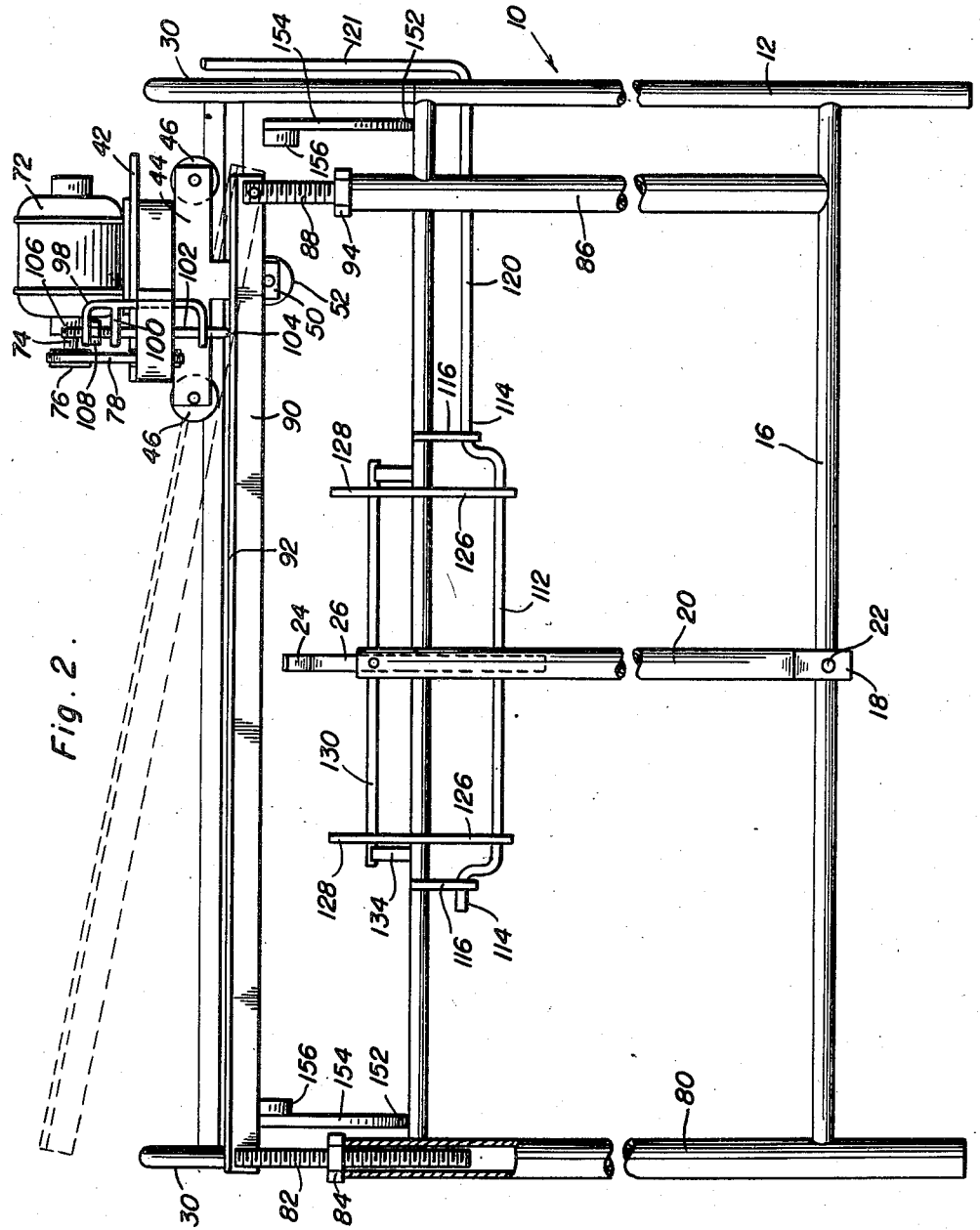

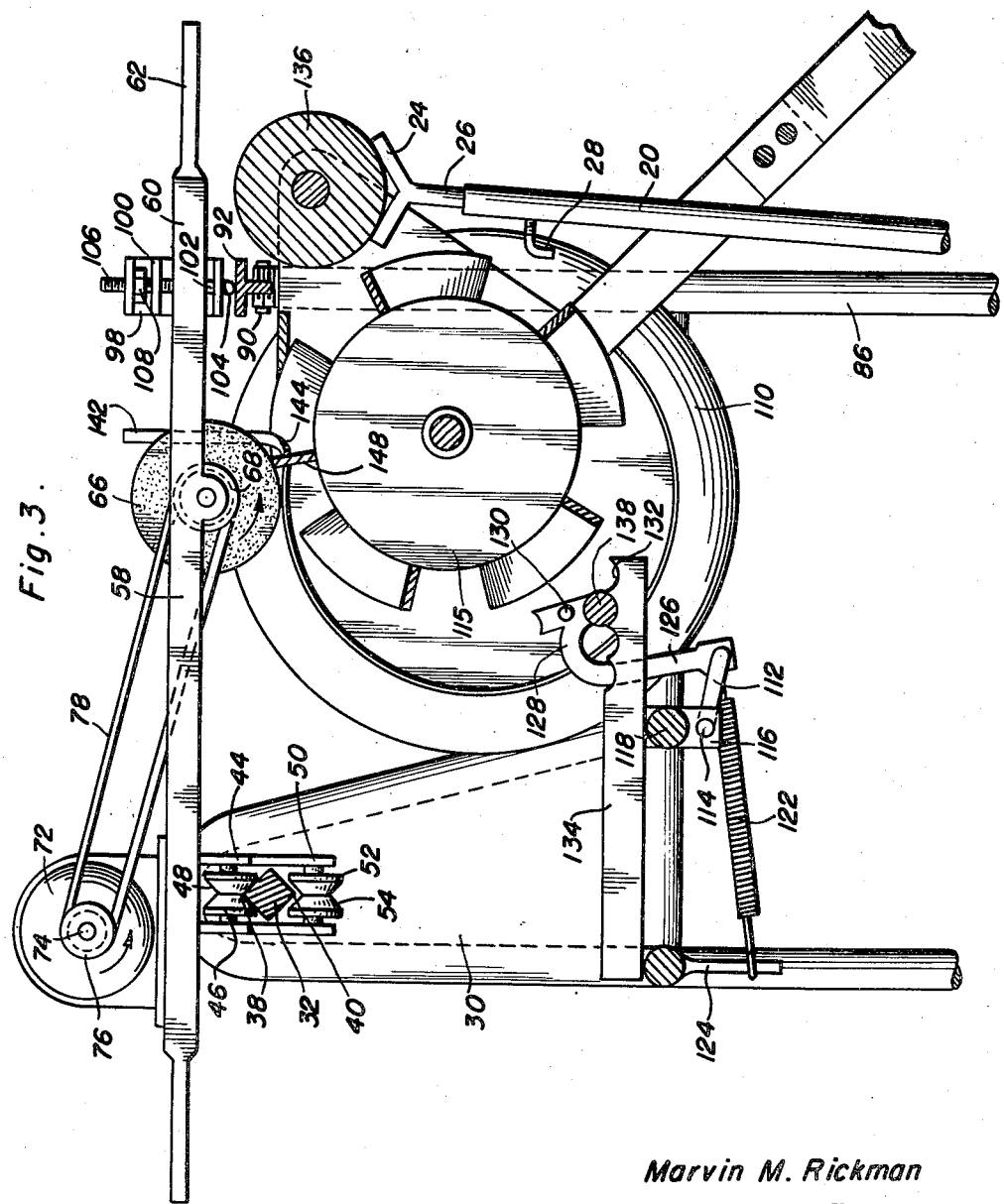

July 31, 1951 — M. M. RICKMAN — 2,562,578
LAWN MOWER SHARPENING MACHINE
Filed June 15, 1948 — 4 Sheets-Sheet 4
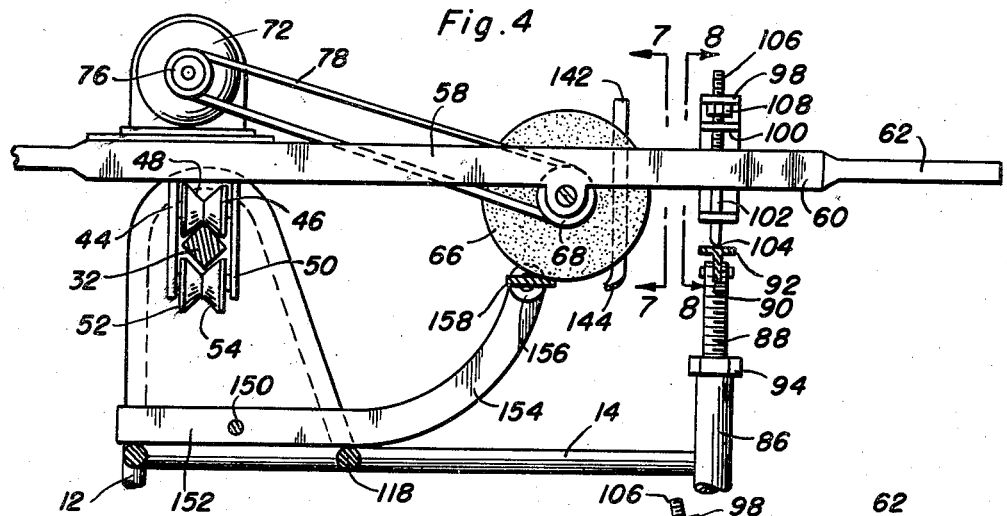
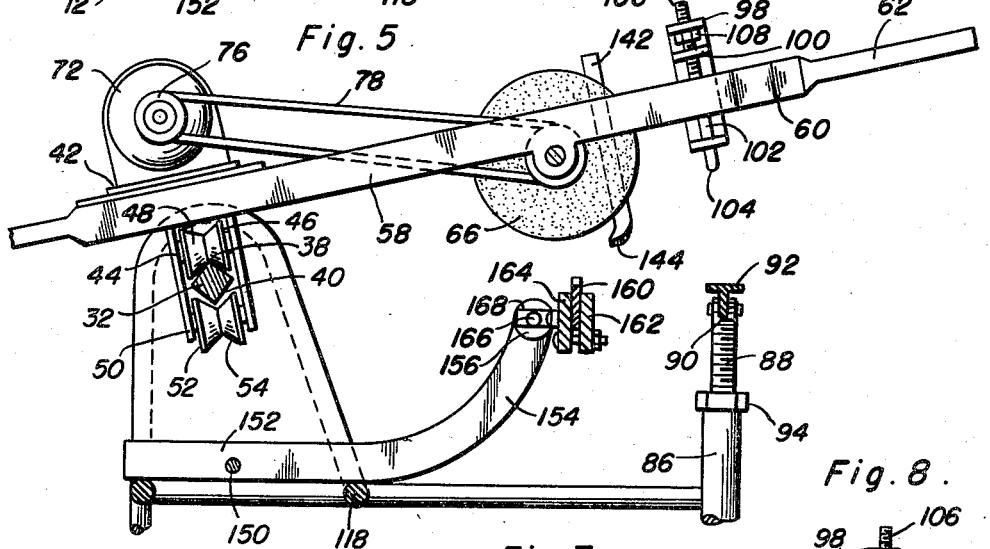
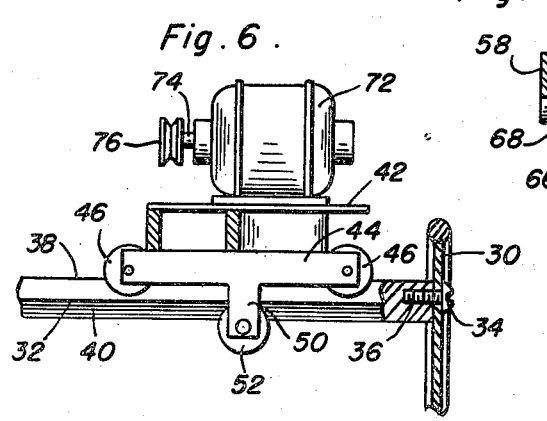
Marvin M. Rickman
INVENTOR.

Patented July 31, 1951

2,562,578

UNITED STATES PATENT OFFICE 2,562,578

LAWN MOWER SHARPENING MACHINE

Marvin M. Rickman, Columbus, Miss., assignor of fifty per cent to Lillie Mae Rickman, Springfield, Ill.

Application June 15, 1948, Serial No. 33,031

6 Claims. (Cl. 51—48)

This invention relates to new and useful improvements in grinding and shapening machines and the primary object of the present invention is to provide a machine for sharpening the helically disposed reel knives and stationary blade of a lawn mower that embodies in its construction a slidable carriage having a frame which rotatably supports a grinding or sharpening head and novel and improved means mounted on the frame for rotating a selected reel knife of a lawn mower as the carriage is moved to bring a portion of a reel knife into engagement with the grinding head.

Another important object of the present invention is to provide a grinding machine for lawn mowers embodying novel and improved means for releasably supporting a lawn mower relative thereto, so that the cutter reel thereof may be quickly and readily sharpened in a convenient manner without the necessity of having to remove the cutter reel from the said lawn mower.

Another object of the present invention is to provide a lawn mower sharpening machine including a rotatable guide, a grinding head supporting member slidably mounted on said guide and rotatable therewith, whereby the said grinding head may be raised to permit the lawn mower to be supported relative to the machine without having to disassemble the lawn mower for such a sharpening operation.

Another object of the present invention is to provide a lawn mower sharpening machine including a slidable carriage, a grinding head supporting frame carried by said carriage, and novel and improved adjustable guide means carried by the machine and engaging said frame for retaining the grinding head mounted thereon in a selected adjusted vertical position.

Another object of the present invention is to provide a blade sharpening machine including novel and improved detachable guide means so designed as to engage either the right hand spiral reel knives or left hand spiral reel knives of a lawn mower and turn the same slightly so as to bring a portion of the said knives into sharpening engagement with a rotary grinding head.

A further object of the present invention is to provide a lawn mower sharpening machine including novel and improved means for adjustably supporting lawn mowers of various sizes relative thereto, so that the cutter reels thereof may be sharpened.

A still further aim of the present invention is to provide a sharpening machine for lawn mowers and the like that is simple and practical in construction, strong and reliable in use, small and compact in structure, neat and attractive in appearance, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a top plan view of the sharpening machine constructed in accordance with the present invention;

Figure 2 is a front elevational view of the present sharpening machine, and with parts thereof broken away;

Figure 3 is an enlarged transverse vertical sectional view of the present lawn mower sharpening machine, taken substantially on the plane of section line 3—3 of Figure 1, and showing a lawn mower applied thereto, and with parts of the machine and lawn mower broken away;

Figure 4 is a fragmentary transverse vertical sectional view of the present invention, and showing the stationary blade of a lawn mower applied thereto for sharpening;

Figure 5 is a view similar to Figure 4, showing the carriage and grinding head supporting frame slightly raised, and a clamping member supported to the present machine and holding a blade that is to be sharpened;

Figure 6 is a fragmentary longitudinal vertical sectional view taken substantially on the plane of section line 6—6 of Figure 1, and with parts of the rotatable guide broken away for the convenience of explanation;

Figure 7 is a vertical sectional view taken substantially on the plane of section line 7—7 of Figure 4; and Figure 8 is a vertical sectional view taken substantially on the plane of section line 8—8 of Figure 4.

Referring now to the drawings in detail, wherein for the purpose of illustration, there is disclosed a preferred embodiment of the present invention, the numeral 10 represents the main frame portion of the present invention generally, it is preferably constructed of tubular members which include upstanding posts 12. The posts 12 are connected and braced to each other by any suitable number of rails 14 including a forward, lower longitudinal rail 16 that slidably engages the bifurcated lower terminal 18 of a tubular supporting post 20.

An adjustable fastener 22 connects the furcations of the bifurcated terminal 18, for longitudinal adjustment of the tubular supporting post 20 on the rail 16.

A forked member 24 is provided with an elongated shank portion 26 that slidably engages the open upper end of the supporting post 20, and a set screw 28 adjustably carried by the post 20 retains the shank portion 26 in a selected extended or adjusted position relative to the supporting post 20.

Rigidly secured to the main frame 10, by any suitable means, is a pair of upstanding, spaced parallel side members 30 between which there extends a substantially horizontal guide bar 32 that is preferably square in cross-section. Fasteners 34 carried by the side members 30 receivably engage internally threaded sockets 36 in the terminals of the guide bar 32 whereby the said guide bar 32 will be rotatably supported between the side members 30. The guide bar 32 is so disposed in a normal position, that it will have one longitudinal edge 38 disposed upwardly and above a further longitudinal edge 40 thereof for a purpose which will now be described.

The numeral 42 represents a carriage or wheeled support from which there depends a pair of spaced parallel, longitudinal plates 44 that rotatably support a pair of spaced, parallel upper guide rollers 46 having central, annular V-shaped grooves 48 that receive the upper longitudinal edge 38 of the guide bar 32.

Integral legs 50 depend from the central portions of the plates 44 and rotatably support a lower roller 52 having an annular V-shaped groove 54 that receives the lower longitudinal edge 40 of the guide bar 32, whereby the carriage 42 will be slidably guided on the guide bar 32 and rotatably therewith to a raised or lowered position.

A pair of spaced, parallel arms 56 and 58 project forwardly from the carriage 42 and the forward free end of arm 58 is angulated as at 60 and rigidly secured to the arm 56 adjacent the reduced extremity 62 thereof. These arms 56 and 58 support a shaft or fastener 64 on which there is rotatably mounted a grinding or sharpening wheel 66 and a pulley 68 that are suitably secured to each other. The wheel 66 is disposed substantially midway between the arms 56 and 58 by a spacer sleeve 70, which is mounted on the shaft 64, and the pulley 68.

A suitable motor 72, preferably electric, is mounted on the carriage 42 and includes a drive shaft 74 on which there is mounted a pulley 76 that is connected to the pulley 68 through the medium of an endless, preferably V-type belt 78.

One forward post or leg 80 of the main frame 10 slidably receives an externally threaded post or upright 82 on which there is receivably engaged a bearing nut 84 that bears upon the upper end of the post 80.

A further vertical and tubular post 86 is fixed on the rail 16 and slidably receives a further externally threaded post or upright 88 the upper end of which is notched to pivotally engage the depending vertical flanged portion 90 of a guide bar 92 that is preferably T-shaped in cross-section.

A bearing nut 94, which is receivably engaged on the post 88, bears upon the upper end of the post 86.

The vertical flange 90 of the guide bar 92 engages a suitable notch provided in the upper terminal of the post 82 for supporting the guide bar 92 in a substantially horizontal position between the posts 82 and 88, as shown best in Figure 2 of the drawings.

Obviously, by adjusting the nuts 84 and 94, the guide bar 92 may be retained in a selected raised or lowered horizontal position or at a selected inclined vertical position.

Removably secured to the arm 56 by a fastener 96, is the web portion of a substantially channel-shaped bracket or support 98 having an auxiliary leg 100. The legs of the channel member or bracket 98 including the auxiliary leg 100, are provided with aligned apertures that slidably engage a substantially vertical bearing member or rod 102 having a rounded or pointed extremity 104 that normally bears upon the guide bar 92. The upper end 106 of the rod 102 is externally threaded to receive a stop nut 108 that bears against the upper leg of the bracket 98, as shown best in Figure 8 of the drawings, to limit the upward sliding movement of the rod 102 relative to the bracket 98.

By adjusting the nut 108, the arms 56 and 58 may be retained in a horizontal or desired vertically inclined position, illustrated best in Figures 3 and 4 of the drawings.

In order to support a lawn mower 110 relative to the main frame and grinding wheel 66, there is provided a substantially U-shaped frame or member 112 having outwardly turned end portions 114 that pivotally engage ears 116 which depend from an upper longitudinal rail 118 carried by the main frame 10. One outturned end of the member 112 is provided with an integral extension 120 the free end 121 of which is angulated to form a hand grip.

A coil spring, or other such resilient means 122, is anchored to the web portion of member 112 and a rod or arm 124 carried by the rear portion of the frame 10 to urge the web portion of member 112 downwardly toward the rear portion of the main frame 10.

A pair of holding members or arms 126 are pivoted on the web portion of member 112 and include integral hooks 128 that are connected by a cross bar 130. This bar 130 engages selected notches or recesses 132 provided in the upper edges of a pair of spaced, substantially rectangular base members 134 that are fixed to the rail 118 and a further connecting rail of the frame 10 as best shown in Figure 3 of the drawings.

Reference is now directed to Figure 3 of the drawings, wherein there is disclosed the present invention in use for sharpening the cutter reel of a lawn mower. To place the lawn mower in the position thus illustrated, the arms 56 and 58 are raised which will likewise rotate the guide bar 32 and raise or pivot the carriage 42 upwardly.

The roller 136 of the mower 110 is supported by the forked member 24 and the cross bar 138 of the mower is retained in a selected of the notches 132 by the hooks 128.

The terminals of the bar 130 will limit the downward pivotal movement of member 112 and the same will engage selected of the notches 132 when the mower is removed from the main frame 10.

Fixed to the inner face of arm 56, is a channeled support 140 that slidably receives a substantially vertical guide bar 142 the lower end of which is arcuately formed and twisted as at 144 to conform to the curvature of the helical blade of a lawn mower cutter reel. A set screw 146 carried by the support 140 retains the bar 142 in a selected adjusted position relative to the helical reel knives or blades 148 of the mower reel 115 and the end 144 will engage and rotate the helical blades 148 as the carriage 42 is moved back and forth upon the guide bar 32.

It should be noted, that as illustrated in the drawings the pulley and drive shaft associated with the motor 72 will rotate in a counter-clockwise direction so that the grinding wheel 66 will also rotate in a counter-clockwise direction to urge the helical blades 148 against the guide or arcuate end 144 of the guide 142. There are many ways in which this desired feature could be accomplished, however, by so positioning the motor as illustrated in the drawings, it is evident that the space between the arms 56 and 58 will be reduced and the same will be spaced from both side members 30 of the main frame 10.

Slidably and pivotally mounted on rods or bars 150 that are fixed between the side members 30 and base members 134, are support arms 152 having arcuate end portions 154. Fixed to the inner faces of the portions 154 and opposing suitable apertures in the portions 154, are hubs 156 that engage the cylindrical ends of a cutter bar 158. These arms 152 will slide on bars 150 to accommodate any length of cutter bar and may be moved toward the side members 30 when not in use, as shown best in Figure 4 of the drawings. The rail 118 will limit downward pivotal movement of these arms 152 in one direction and a further rail, spaced parallel to the rail 118 and forming a part of the main frame 10, will limit the pivotal movement of these arms in a further direction, as shown best in Figures 1, 4 and 5 of the drawings.

Reference is now directed to Figure 5, wherein there is disclosed the present invention in use for sharpening saw blades or any other such suitable blade 160. When the present invention is used in this capacity, any suitable clamp or a pair of adjustably connected jaws 162 and 164 are applied to a bar 166 between the hubs 156 and the jaw 164 fixed to the said shaft by a bracket or the like 168.

In practical use of the present invention, the bed knife on the cutter bar is first cleared from the reel blades by the adjusting screw, and then the lawn mower is turned bottom side up and placed on the base members 134 so that the cross bar 138 thereof will be clamped on the base members 134 by the hooks 128.

Next, the support 20 is adjusted so that the forked member 24 will engage the guide roller 136 of the lawn mower 110. The carriage 42 is lowered so that the bearing element 102 will engage the guide 92.

The motor 72 is then actuated so that the grinding wheel 66 will rotate in a counter-clockwise direction to urge the reel blade 144 of the mower 110 against the guide 142. As the operator moves the carriage 42 upon the guide bar 32, the cutter reel will be rotated slightly to always bring a portion of the reel knife 148 into sharpening engagement with the grinding wheel 66. Obviously, the present invention could be employed for sharpening other than mower blades, however, its primary feature is that it includes a means for supporting the mower in such a manner that the same will not tilt or move during the sharpening thereof.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible of certain changes fully comprehended by the spirit of the invention as herein described and the scope of the appended claims.

Having described the invention, what is claimed as new is:

1. A lawn mower reel sharpening machine comprising a main frame, an elongated guide bar pivoted at its ends to said main frame and disposed in a substantially horizontal plane, a carriage, means carried by said carriage slidably engaging said guide bar and holding said carriage relative to said guide bar for pivotal movement therewith, a pair of arms carried by said carriage, a driven shaft rotatably carried by said arms, a grinding wheel carried by said driven shaft, power means mounted on said carriage and above said guide bar and operatively connected to said driven shaft for rotating the latter, a further guide bar carried by said main frame, an adjustable bearing member carried by one of said arms and engaging said further guide bar, means adjustably carried by one of said arms for engaging and turning a lawn mower reel during sliding movement of said carriage, and means for supporting a lawn mower relative to said main frame, said last named means including a pair of horizontal base members carried by said main frame, a U-shaped frame swingably mounted on said main frame, a spring means connecting said U-shaped frame to said main frame to urge said U-shaped frame to its lowered position, and retaining means carried by said U-shaped frame for retaining the crossbar of a lawn mower against said base members.

2. A lawn mower reel sharpening machine comprising a main frame, an elongated guide bar pivoted at its ends to said main frame and disposed in a substantially horizontal plane, a carriage, means carried by said carriage slidably engaging said guide bar and holding said carriage relative to said guide bar for pivotal movement therewith, a pair of arms carried by said carriage, a driven shaft rotatably carried by said arms, a grinding wheel carried by said driven shaft, power means mounted on said carriage and operatively connected to said driven shaft for rotating the latter, a further guide bar carried by said main frame, an adjustable bearing member carried by one of said arms and engaging said further guide bar, a guide block fixed to one of said arms and having a substantially vertical slot, a reel turning arm slidably and adjustably carried by said guide block, and means for supporting a lawn mower relative to said main frame, said last-named means including a pair of horizontal base members carried by said main frame, a U-shaped frame swingably mounted on said main frame, a spring means connecting said U-shaped frame to said main frame to urge said U-shaped frame to its lowered position, and retaining means carried by said U-shaped frame for retaining the cross-bar of a lawn mower against said base members.

3. A lawn mower sharpener comprising a main frame having a pair of side members, a substantially horizontal guide bar, means rotatably securing the ends of said guide bar to said side members, a wheeled carriage slidable on said guide bar and rotatable therewith, a pair of vertically adjustable posts carried by said main frame, a further guide bar having a substantially vertical flange, means pivotally securing one end of said further guide bar to one of said posts, the remaining of said posts having a notch in its upper terminal for receiving said further guide bar to support the said further guide bar in a substantially horizontal position, a pair of arms fixed to and projecting outwardly from said carriage, a driven shaft journaled for rotation on said arms, means mounted on said carriage for driving said driven shaft, a grinding wheel mounted on said driven shaft for rotation therewith, a support bracket slidably and adjustably carried by one of said arms, a bearing element adjustably carried by said bracket engaging said further guide bar and supporting said arms in a substantially horizontal position, a tubular support carried by said main frame, a forked member adjustable in said tubular support and engageable with the roller of a lawn mower, means carried by said main frame for releasably supporting the cross bar of a lawn mower, and means adjustably carried by one of said arms for engaging a selected reel knife of a lawn mower and turning and retaining the same in position to said grinding wheel.

4. The combination of claim 3, wherein said means for releasably supporting the cross bar of a lawn mower includes a pivotal substantially U-shaped frame carried by said main frame, a pair of holding bars pivoted on the web portion of said U-shaped frame, said holding bars having terminal hooks for engaging the cross bar of a lawn mower, base members carried by said main frame and coacting with said holding bars to support the cross bar of a lawn mower, means normally urging the web portion of said U-shaped frame downwardly relative to said base members, and means connecting said hooks.

5. In a blade sharpening machine including a main frame, a horizontally rotatable guide supported on said main frame, a carriage slidably mounted on said guide, a further frame carried by said carriage and supporting a grinding wheel, a vertically adjustable horizontal guide carried by said main frame and slidably supporting the further frame, a pair of horizontally disposed base members mounted on said main frame for supporting the crossbar of a lawn mower, a vertically swingable U-shaped frame carried by said main frame and underlying said base members, a pair of holding arms swingably carried by said U-shaped frame and having terminal hooks for engaging the crossbar of a lawn mower, and spring means connecting said U-shaped frame to said main frame and urging said arms toward the crossbar of a mower supported on said base members.

6. The combination of claim 5 and a connecting bar joining said arms and being of a length greater than the distance between said base members whereby the ends of said connecting bar will engage the base members to limit downward swinging movement of said arms and said U-shaped frame.

MARVIN M. RICKMAN.

REFERENCES CITED

The following references are of record in the file of this patent:

UNITED STATES PATENTS

| Number | Name | Date |
|---|---|---|
| 1,389,588 | Klay | Sept. 6, 1921 |
| 1,657,757 | Krenz | Jan. 31, 1928 |
| 1,916,063 | Miller | June 27, 1933 |
| 2,142,669 | Carpenter | Jan. 3, 1939 |
| 2,187,289 | Utterback | Jan. 16, 1940 |
| 2,281,055 | Smith | Apr. 28, 1942 |